(12) United States Patent
MacAdam et al.

(10) Patent No.: US 7,796,629 B1
(45) Date of Patent: Sep. 14, 2010

(54) PACKET SWITCH WITH CONFIGURABLE BANDWIDTH ALLOCATION PRECISION

(75) Inventors: Angus David Starr MacAdam, Suwanee, GA (US); Robert Henry Bishop, Suwanee, GA (US); Brian Scott Darnell, Suwanee, GA (US)

(73) Assignee: Integrated Device Technology, inc., San Jose, CA (US)

( * ) Notice: Subject to any disclaimer, the term of this patent is extended or adjusted under 35 U.S.C. 154(b) by 50 days.

(21) Appl. No.: 12/331,372

(22) Filed: Dec. 9, 2008

Related U.S. Application Data

(60) Provisional application No. 61/013,244, filed on Dec. 12, 2007.

(51) Int. Cl.
*H04L 12/56* (2006.01)

(52) U.S. Cl. ........................ 370/422; 370/352

(58) Field of Classification Search ................ 370/352, 370/235, 400, 368, 232, 295, 411; 709/215, 709/228, 249
See application file for complete search history.

(56) References Cited

U.S. PATENT DOCUMENTS

| | | | |
|---|---|---|---|
| 4,314,367 A | 2/1982 | Bakka et al. | |
| 5,511,070 A * | 4/1996 | Lyles | 370/411 |
| 6,014,690 A * | 1/2000 | VanDoren et al. | 709/215 |
| 6,249,520 B1 * | 6/2001 | Steely et al. | 370/368 |
| 6,272,127 B1 * | 8/2001 | Golden et al. | 370/352 |
| 7,010,607 B1 * | 3/2006 | Bunton | 709/228 |
| 7,020,133 B2 | 3/2006 | Zhao et al. | |
| 7,145,904 B2 | 12/2006 | Zhao et al. | |
| 7,155,553 B2 * | 12/2006 | Lueck et al. | 710/305 |
| 7,274,701 B2 * | 9/2007 | Boduch et al. | 370/395.4 |
| 7,304,987 B1 | 12/2007 | James et al. | |
| 7,305,492 B2 * | 12/2007 | Bryers et al. | 709/249 |
| 7,406,086 B2 * | 7/2008 | Deneroff et al. | 370/400 |
| 2002/0199205 A1 * | 12/2002 | Sonawane et al. | 725/115 |
| 2003/0107996 A1 * | 6/2003 | Black et al. | 370/235 |
| 2004/0017804 A1 | 1/2004 | Vishnu | |

(Continued)

OTHER PUBLICATIONS

Xin Li, Latfi Mhamdi, Jung Liu, Konghong Pun, and Mournir Hamdi, "1.3 Buffered Crossbar Switches," High-performance Packet Switching Architectures, pp. 12-13 and 36-37, Springer London, Aug. 30, 2006.

(Continued)

*Primary Examiner*—Thong H Vu
(74) *Attorney, Agent, or Firm*—Stanley J. Pawlik; Kenneth Glass; Glass & Associates

(57) ABSTRACT

A packet switch including input ports and output ports allocates an output bandwidth of each output port among virtual channels based on bandwidth allocations values corresponding to the virtual channels and a bandwidth precision value of the output port. The bandwidth precision value indicates a number of bandwidth precision bits, which may be outside a bandwidth reservation precision range specified in a serial RapidIO standard. The packet switch receives data packets compliant with the serial RapidIO standard at the input ports, identifies an output port for each data packet, and selects input ports based on the output ports of the data packets. Further, the packet switch routes a data packet from each selected input port to the output port of the data packet, and the output port outputs the data packet by using the output bandwidth of the output port allocated to the virtual channel identified by the data packet.

24 Claims, 8 Drawing Sheets

U.S. PATENT DOCUMENTS

2004/0103218 A1    5/2004    Blumrich et al.
2006/0028987 A1*   2/2006    Gildfind et al. ............. 370/232
2006/0221948 A1   10/2006    Benner et al.

OTHER PUBLICATIONS

Zhen Guo, Roberto Rojas-Cessa, and Nirwan Ansari "Packet Switch with Internally Buffered Crossbars," High-performance Packet Switching Architectures, pp. 121-146, Springer London, Aug. 30, 2006.

Kenji Yoshigoe and Ken Christensen "The Combined Input and Crosspoint Queued Switch," High-performance Packet Switching Architectures, pp. 169-195, Springer London, Aug. 30, 2006.

Xiao Zhang and Laxmi N. Bhuyan, "Deficit Round-Robin Scheduling for Input-Queued Switches" IEEE Journal on Selected Areas in Communications, pp. 584-594, vol. 21, No. 4, May 2003.

M Shreedhar and George Varghese, "Efficient Fair Queuing Using Deficit Round Robin" IEEE/ACM Transactions on Networking, pp. 375-385, vol. 4, No. 3, Jun. 1996.

Kang Xi, Shin'ichi Arakawa, Masayuki Murata, Ning Ge and Chongxi Feng, "Packet-Mode Scheduling with Proportional Fairness for Input-Queued Switches" IEICE Trans. Commun., pp. 4274-4284, vol. E88—B, No. 11 Nov. 2005.

* cited by examiner

PACKET SWITCH WITH CONFIGURABLE BANDWIDTH ALLOCATION PRECISION

CROSS-REFERENCE TO RELATED APPLICATION

The present application claims benefit of U.S. Provisional Application Ser. No. 61/013,244, filed Dec. 12, 2007, entitled "Next-Generation SRIO Switching Devices and Methods," which is incorporated herein by reference in its entirety.

BACKGROUND

Serial RapidIO (sRIO) is a serial interconnect technology employed in many packet-based communication systems. These communications systems include source devices, destination devices, and packet switches that communicate with each other through communication links. One feature of sRIO that facilitates communication in these packet switches involves virtual channels. Virtual channels provide a mechanism for allocating an output bandwidth of an output port of the packet switch among unrelated data streams. In this mechanism, each virtual channel of an output port is allocated a guaranteed minimum portion of the output bandwidth of the output port.

As specified in the sRIO 2.0 standard, a packet switch may be implemented such that an output port of the packet switch has a bandwidth reservation precision. The bandwidth reservation precision specifies the number of bandwidth reservation precision bits used in allocating a portion of an output bandwidth of an output port to a virtual channel of the output port. As also specified in the sRIO 2.0 standard, the bandwidth reservation precision may range from eight to sixteen bits and is determined by a bandwidth reservation precision value stored in a read-only register. Accordingly, the bandwidth reservation precision of an output port is implementation dependent and may not be modified. Further, in some packet-based communication systems, the bandwidth reservation precision range as specified in the sRIO 2.0 standard does not provide a desired precision for allocating a portion of the output bandwidth of an output port to a virtual channel.

In light of the above, a need exists for an improved system and method of routing data packets through a packet switch by using virtual channels.

SUMMARY

In various embodiments, a packet switch substantially compliant with a serial RapidIO standard includes output ports, each of which allocates at least a portion of an output bandwidth of the output port among virtual channels based on bandwidth allocations values corresponding to the virtual channels and a bandwidth precision value of the output port. The bandwidth precision value indicates a number of bandwidth precision bits which may be outside a bandwidth reservation precision range specified in the serial RapidIO standard. Additionally, the packet switch includes input ports for receiving data packets, each of which identifies one of the virtual channels and is compliant with the serial RapidIO standard. Each input port receiving a data packet identifies a destination output port of the packet switch for the data packet. Further, the packet switch selects input ports based on the destination output ports of the data packets received by the input ports and routes a data packet from each selected input port to the destination output port of the data packet. In turn, each output port receiving a data packet outputs the data packet from the packet switch by using the output bandwidth of the output port allocated to the virtual channel identified by the data packet. In some embodiments, an input port of the packet switch may receive a multicast data packet and identify more than one destination output port of the packet switch for the multicast data packet. In these embodiments, the packet switch selects input ports based on each destination output port of the data packets received by the input ports.

A packet switch, in accordance with one embodiment, includes input ports, output ports, an arbiter, and a switch fabric. The arbiter and the switch fabric are both coupled to the input ports and the output ports. Each of the outputs ports has an output bandwidth and is configured to store a bandwidth precision value for the output port. The bandwidth precision value indicates a number of bandwidth precision bits in a range including a number of bandwidth precision bits outside a bandwidth reservation precision range specified in a serial RapidIO 2.0 standard. Additionally, each of the output ports is configured to allocate at least a portion of the output bandwidth of the output port among a plurality of virtual channels based on bandwidth allocation values of the output port corresponding to the virtual channels and the bandwidth precision value of the output port. Each of the input ports is configured to receive a data packet and identify one or more of the output ports as a destination output port for the data packet. Moreover, the data packet identifies a virtual channel for the data packet and is compliant with the serial RapidIO 2.0 standard. The arbiter is configured to select at least one of the input ports based on the destination output ports of the data packets received by the input ports. The switch fabric is configured to route each data packet received by a selected input port to at least one destination output port of the data packet. Further, each of the output ports is configured to output each data packet received from the switch fabric by using the output bandwidth of the output port allocated to the virtual channel identified by the data packet.

A packet switch, in accordance with one embodiment, includes input ports, output ports, an arbiter, and a switch fabric. The arbiter and the switch fabric are both coupled to the input ports and the output ports. Each of the output ports has an output bandwidth and includes a packet engine, a bandwidth precision register, and bandwidth allocation registers. The bandwidth precision register is configured to store a bandwidth precision value for the output port indicating a number of bandwidth precision bits in a range including a number of bandwidth precision bits outside a bandwidth reservation precision range specified in a serial RapidIO 2.0 standard. The bandwidth allocation registers of each output port correspond to virtual channels and are configured to store bandwidth allocation values of the output port corresponding to the virtual channels. The packet engine is configured to allocate at least a portion of the output bandwidth of the output port among the virtual channels based on the bandwidth allocation values of the output port and the bandwidth precision value of the output port. Each of the input ports is configured to receive a data packet and identify one or more of the output ports as a destination output port for the data packet. Moreover, the data packet identifies a virtual channel for the data packet and is compliant with the serial RapidIO 2.0 standard. The arbiter is configured to select at least one input port of the plurality of input ports based on the destination output ports of the data packets received by the plurality of input ports. The switch fabric is configured to route each data packet received by a selected input port to at least one destination output port of the data packet. Further, each of the output ports is configured to output each data packet received from the switch fabric by using the output bandwidth of the output port allocated to the virtual channel identified by the data packet.

A method of routing data packets through a packet switch, in accordance with one embodiment, includes receiving data packets at input ports of a packet switch. Each of the data packets identifies a virtual channel for the data packet and is compliant with a serial RapidIO 2.0 standard. The method further includes identifying at least one destination output port from output ports of the packet switch for each data packet received by an input port. Moreover, each of the output ports has an output bandwidth. Additionally, the method includes storing a bandwidth precision value for each of the output ports. The bandwidth precision value indicates a number of bandwidth precision bits in a range including a number of bandwidth precision bits outside a bandwidth reservation precision range specified in the serial RapidIO 2.0 standard. The method also includes allocating at least a portion of the output bandwidth of each output port among virtual channels based on bandwidth allocation values of the output port corresponding to the virtual channels and the bandwidth precision value of the output port. The method further includes selecting at least one of the input ports based on the destination output ports of the data packets received by the input ports. Additionally, the method includes routing each data packet received by a selected input port to at least one destination output port of the data packet. The method also includes outputting each data packet received by an output port by using the output bandwidth of the output port allocated to the virtual channel identified by the data packet.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a packet switch substantially compliant with a serial RapidIO standard and including input ports and output ports allocates an output bandwidth of each output port among virtual channels based on bandwidth allocation values of the output port corresponding to the virtual channels and a bandwidth precision value of the output port. The bandwidth precision value indicates a number of bandwidth precision bits, which may be outside a bandwidth reservation precision range specified in the serial RapidIO standard. The packet switch receives data packets compliant with the serial RapidIO standard at the input ports, identifies a destination output port for each data packet, and selects input ports based on the destination output ports of the data packets. Further, the packet switch routes a data packet from each selected input port to the destination output port of the data packet. In turn, the destination output port outputs the data packet by using the output bandwidth of the destination output port allocated to the virtual channel identified by the data packet.

Figure 1:
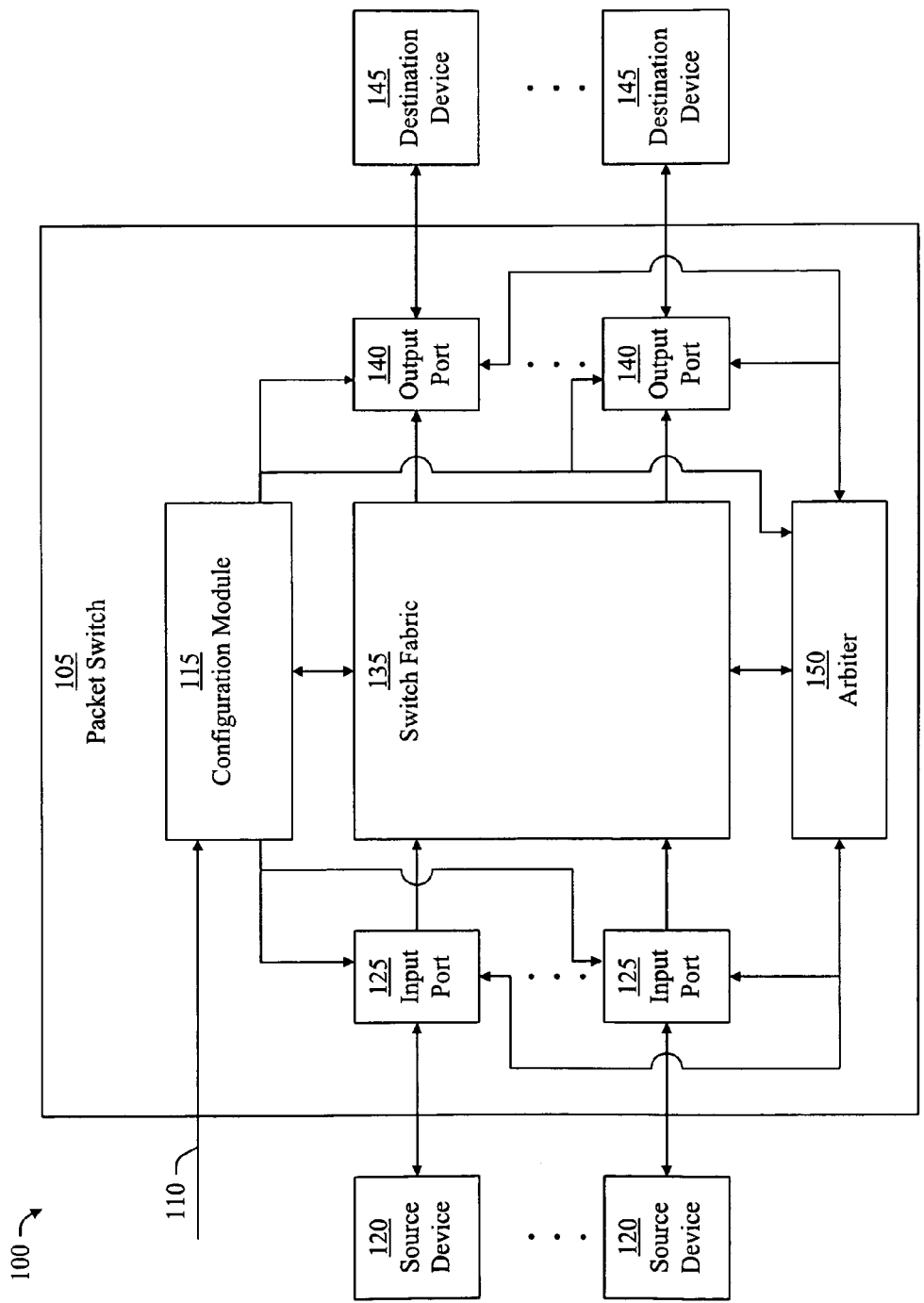
FIG. 1 is a block diagram of a communication system, in accordance with an embodiment of the present invention.

FIG. 1 illustrates a communication system 100, in accordance with an embodiment of the present invention. The communication system 100 includes a packet switch 105, source devices 120 coupled (e.g., connected) to the packet switch 105, and destination devices 145 coupled (e.g., connected) to the packet switch 105. The source devices 120 send data packets to the packet switch 105 and the packet switch 105 routes the data packets to the destination devices 145 based on the data packets. In various embodiments, the packet switch 105 routes a data packet received from a source device 120 to a destination device 145 by using a virtual channel having a bandwidth allocation indicating a minimum bandwidth of the virtual channel. The bandwidth allocation of the virtual channel is determined by a bandwidth allocation value associated with the virtual channel. Moreover, the precision of the bandwidth allocation of the virtual channel is determined by a bandwidth precision value associated with the virtual channel.

In some embodiments, the packet switch 105 is capable of modifying the bandwidth allocation of a virtual channel. For example, the packet switch 105 may modify the bandwidth allocation of a virtual channel by modifying the bandwidth allocation value of the virtual channel or the bandwidth precision value of the virtual channel, or both, based on user input to the packet switch 105. In this way, the packet switch 105 is configurable (e.g. programmable) to select the bandwidth allocation of the virtual channel and the precision of the bandwidth allocation of the virtual channel.

In various embodiments, the packet switch 105 is substantially compliant with (e.g., conforms to) a serial RapidIO (sRIO) standard. In these embodiments, the packet switch 105 receives data packets compliant with the sRIO standard from the source devices 120, routes the data packets through the packet switch 105 substantially in compliance with the sRIO standard, and sends data packets compliant with the sRIO standard to the destination devices 145. In some embodiments, the packet switch 105 is substantially compliant with the sRIO standard but the packet switch 105 may select a bandwidth precision of a virtual channel of the packet switch 105 outside a range of bandwidth reservation precision values specified in the sRIO standard. In some embodiments, the packet switch 105 is substantially compliant with the sRIO standard but the packet switch 105 may modify a bandwidth precision of a virtual channel of the packet switch 105 during operation of the packet switch 105. In some embodiments, the packet switch 105 is fully compliant with the sRIO standard but the packet switch 105 may select a bandwidth precision of a virtual channel of the packet switch 105 outside a range of bandwidth reservation precision values specified in the sRIO standard or modify a bandwidth precision of a virtual channel of the packet switch 105 during operation of the packet switch 105, or both. In these embodiments, the packet switch 105 is considered to be substantially compliant with the sRIO standard.

In some embodiments, the packet switch 105 is substantially compliant with (e.g., conforms to) the sRIO standard but the packet switch 105 may select a bandwidth allocation of a virtual channel such that the bandwidth allocation includes more or fewer bits than the number of bits specified for a bandwidth allocation in the sRIO standard. For example, the sRIO standard may specify sixteen bits for a bandwidth allocation and the packet switch 105 may select a bandwidth allocation having more or fewer than sixteen bits. In various embodiments, the packet switch 105 is substantially compliant with (e.g., conforms to) the sRIO 2.0 standard, which is incorporated by reference herein in its entirety. In some embodiments, the packet switch 105 is implemented in a single semiconductor die. In other embodiments, the packet switch 105 is implemented in multiple semiconductor die and contained in a chip package. For example, the packet switch 105 may be contained in a multichip package. In some embodiments, the packet switch 105 is implemented in one or more programmable chips. For example, the packet switch 105 may be implemented in one or more field programmable gate arrays (FPGAs).

In various embodiments, the packet switch 105 includes a configuration module 115, input ports 125, an arbiter 150, a switch fabric 135, and output ports 140. The input ports 125 are coupled (e.g., connected) to the configuration module 115, the arbiter 150, and the switch fabric 135. The output ports 140 are coupled (e.g., connected) to the configuration module 115, the arbiter 150, and the switch fabric 135. In some embodiments, the switch fabric 135 is coupled (e.g., connected) to the arbiter 150 or the configuration module 115, or both. In various embodiments, the arbiter 150 is distributed in the packet switch 105, as is described more fully herein. For example, the input ports 125, the switch fabric 135, and the output ports 140 may each contain a portion of the arbiter 150.

In operation, the input ports 125 receive data packets, or portions of data packets, from source devices 120 corresponding to the input ports 125. Each input port 125 receiving a data packet, or a portion of a data packet, identifies a destination output port 140 for the data packet based on the data packet, or the portion of the data packet, received by the input port 125. For example, an input port 125 may identify a destination output port 140 of a data packet received by the input port 125 based on a destination identifier (e.g., a destination address) in a header of the data packet. The arbiter 150 selects input ports 125 based on the destination output ports 140 of the data packets such that the switch fabric 135 is capable of contemporaneously routing each data packet received by a selected input port 125 to the destination output port 140 of the data packet. In turn, the switch fabric 135 contemporaneously routes the data packets from the selected input ports 125 to the destination output ports 140 of the data packets. Further, each output port 140 (e.g., destination output port 140) receiving a data packet from a selected input port 125 through the switch fabric 135 outputs the data packet from the packet switch 105 to the destination device 145 corresponding to the output port 140 by using the output bandwidth of the output port 140 allocated to the virtual channel of the data packet.

In some embodiments, the data packets received by the input ports 125 of the packet switch 105 may include one or more multicast data packets. Each input port 125 receiving a multicast data packet, or a portion of a multicast data packet, identifies destination output ports 140 for the multicast data packet based on the data packet, or the portion of the multicast data packet, received by the input port 125. For example, an input port 125 may identify destination output ports 140 of a multicast data packet received by the input port 125 based on a destination identifier (e.g., a destination address) in a header of the multicast data packet. In these embodiments, the arbiter 150 selects input ports 125 based on the destination output ports 140 of the data packets such that the switch fabric 135 is capable of contemporaneously routing each data packet received by a selected input port 125 to each destination output port 140 of the data packet.

In some embodiments, the switch fabric 135 routes a data packet from a selected input port 125 to the destination output port 140 of the data packets by using a cut-through technique. In the cut-through technique, the arbiter 150 selects an input port 125 in an arbitration cycle and the switch fabric 135 routes a portion (e.g., a data unit) of a data packet from the selected input port 125 to the destination output port 140 of the data packet in the arbitration cycle. Moreover, the input port 125 remains selected by the arbiter 150 in one or more subsequent arbitration cycles until the switch fabric 135 routes each portion (e.g., data unit) of the data packet to the destination output port 140 of the data packet.

The configuration module 115 configures (e.g., programs) operation of the packet switch 105, for example based on information received from a user through a communication channel 110. In various embodiments, the configuration module 115 configures each input port 125 to identify an output port 140 (e.g., a destination output port 140) based on a data packet received by the input port 125. In some embodiments, the configuration module 115 maintains a route table for each input port 125 for mapping a destination identifier of a data packet received by the input port 125 to a port identifier identifying an output port 140 in the packet switch 105. In these embodiments, the input port 125 identifies a port identifier from the route table based on the destination identifier of the data packet. In this way, the input port 125 identifies a destination output port 140 for the data packet. Further, the input port 125 provides the port identifier to the switch fabric 135 along with the data packet, or each portion of the data packet, and the switch fabric 135 routes the data packet to the output port 140 identified by the port identifier (e.g., a destination output port 140).

In various embodiments, the precision of the output bandwidth of an output port 140 allocated to virtual channels of the output port 140 represents fidelity of the allocated bandwidths of the virtual channels in the output port 140. Moreover, the fidelity of the allocated bandwidths of the virtual channel increases in the output port 140 as the precision of the output bandwidth of the output port 140 allocated to the virtual channels increases. Conversely, the fidelity of the allocated bandwidths of the virtual channels decreases in the output port 140 as the precision of the output bandwidth of the output port 140 allocated to the virtual channel decreases. Moreover, a tradeoff exists between the fidelity of the allocated bandwidths of the virtual channels of an output port 140 and the response time of the arbiter 150 to data packets of different virtual channels routed to the output port 140.

In these embodiments, the response time of the arbiter 150 to data packets of different virtual channels flowing through the output port 140 decreases as the precision of the bandwidth allocations of the virtual channels of the output port 140 increases. Further in these embodiments, a user (e.g., a programmer) of the packet switch 105 may select the precision of the bandwidth allocations of the virtual channels of the output port 140 to achieve a desired tradeoff between fidelity of the bandwidth allocations of the virtual channels and the response time of the arbiter 150 to data packets of different virtual channels flowing through the output port 140. In this way, the user may configure the packet switch 105 for a specific application of the packet switch 105.

Figure 2:
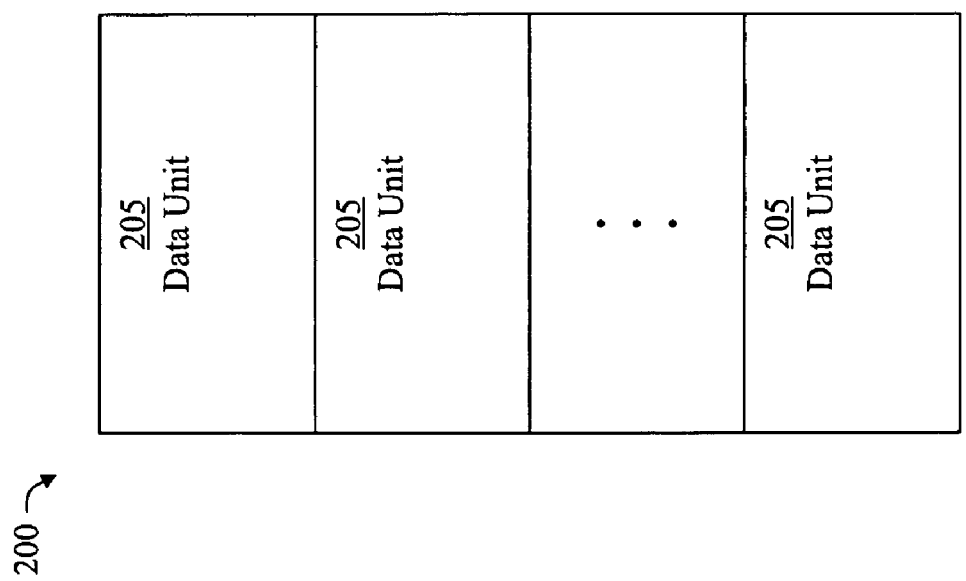
FIG. 2 is a block diagram of a data packet, in accordance with an embodiment of the present invention.

FIG. 2 illustrates a data packet 200, in accordance with an embodiment of the present invention. The data packet 200 includes data units 205, each of which contains data of the data packet 200 (e.g., a portion of the data packet 200). The data unit 205 may be any unit of data, such as a data bit, a data byte, a data word, or the like. Moreover, the data packet 200 has a size which depends upon the number of data units 205 in the data packet 200 and the size of each data unit 205 in the data packet 200. In some embodiments, the data packet 200 has a fixed size (e.g., a predetermined size). In other embodiments, the data packet 200 has a variable size. For example, the data packet 200 may include a single data unit 205 or any number of data units 205.

In various embodiments, the packet switch 105 receives a data packet 200 by receiving a data unit 205 (e.g., a first data unit 205) of the data packet 200. Further, the packet switch 105 routes the data packet 200 through the packet switch 105 by individually routing each data unit 205 of the data packet 200 through the packet switch 105. In this way, the packet switch 105 may receive a data unit 205 of a data packet 200 and route the data unit 205 through the packet switch 105 before receiving all of the data units 205 of the data packet 200. In further embodiments, the packet switch 105 routes a data packet 200 containing data units 205 through the packet switch 105 as an atomic unit. In these embodiments, an input port 125 selected by the arbiter 150 provides the data units 205 of a data packet 200 to the switch fabric 135 in sequence without providing a data unit 205 of another data packet 200 to the switch fabric 135 between any two data units 205 in the sequence.

Figure 3:
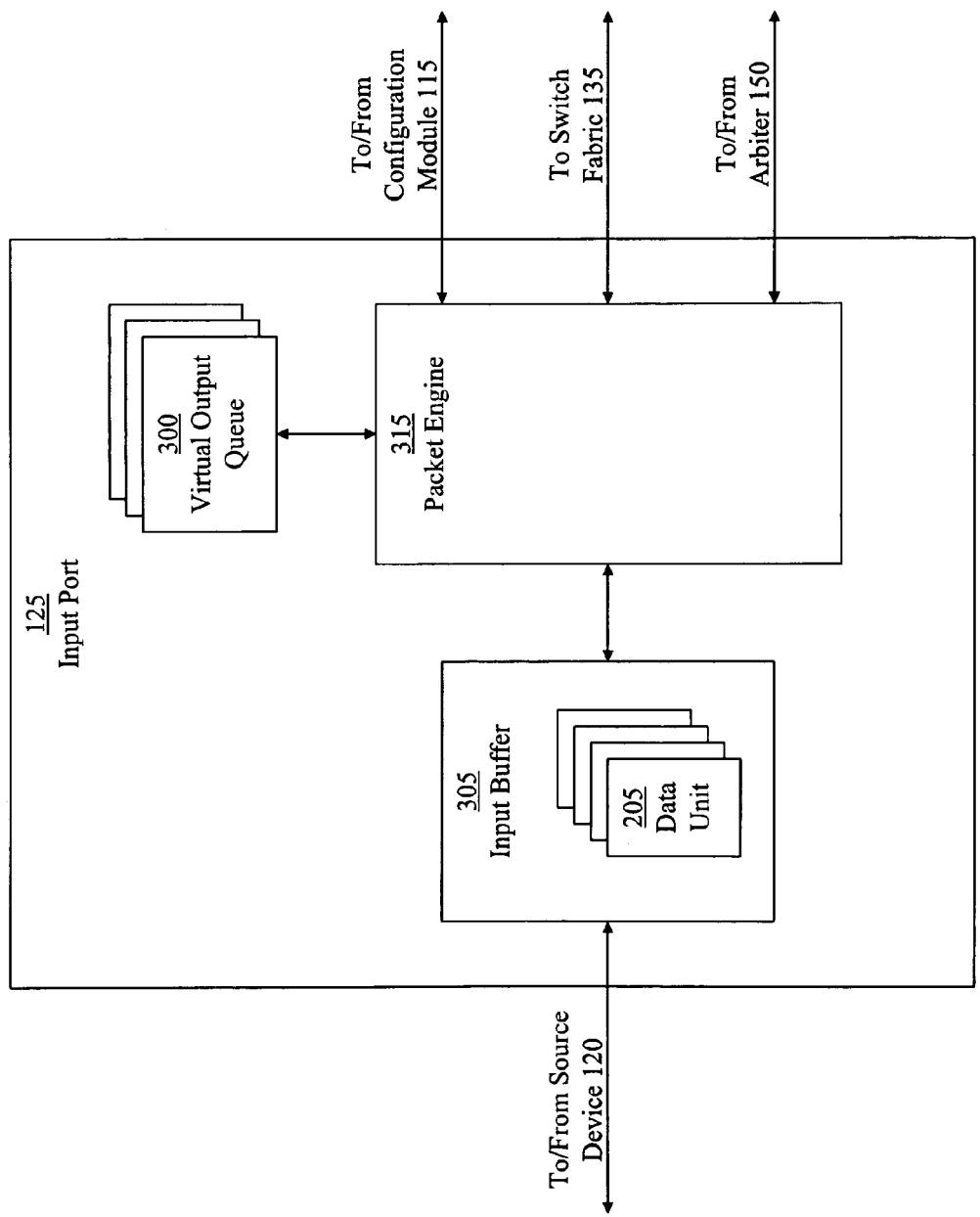
FIG. 3 is a block diagram of an input port of a packet switch, in accordance with an embodiment of the present invention.

FIG. 3 illustrates the input port 125, in accordance with an embodiment of the present invention. The input port 125 includes virtual output queues 300, an input buffer 305, and a packet engine 315. The packet engine 315 is coupled (e.g., connected) to the virtual output queues 300 and the input buffer 305. Moreover, the virtual output queues 300 correspond to the output ports 140 of the packet switch 105. The input port 125 receives data units 205 (e.g., portions) of a data packet 200 from the source device 120 corresponding to the input port 125 and writes the data units 205 of the data packet 200 into the input buffer 305. In turn, the input buffer 305 stores the data units 205.

The packet engine 315 identifies a destination output port 140 for each data unit 205 of the data packet 200 stored in the input buffer 305. For example, the packet engine 315 may identify a destination output port 140 of a data packet 200 from a route table, based on a destination identifier in the data packet 200 containing the data unit 205. Additionally, the packet engine 315 updates the virtual output queue 300 corresponding to the destination output port 140 by mapping the data packet 200 stored in the input buffer 305 to the destination output port 140. In this way, the packet engine 315 maps each data unit 205 of the data packet 200 to the destination output port 140 of the data packet 205 (e.g., the same destination output port 140).

In further embodiments, the input port 125 receives a multicast data packet 200 from the source device 120 corresponding to the input port 125. In turn, the input port 125 stores the multicast data packet 200 in the input buffer 305 by storing one or more data units 205 of the multicast data packet 200 in the input buffer 305. The packet engine 315 identifies more than one destination output port 140 of the multicast data packet 200 and updates the virtual output queues 300 corresponding to the identified destination output ports 140 of the multicast data packet 200 by mapping the multicast data packet 200 to each of the identified destination output ports 140. In this way, the packet engine 315 maps each data unit 205 of the multicast data packet 200 to each destination output port of the multicast data packet 200.

Figure 4:
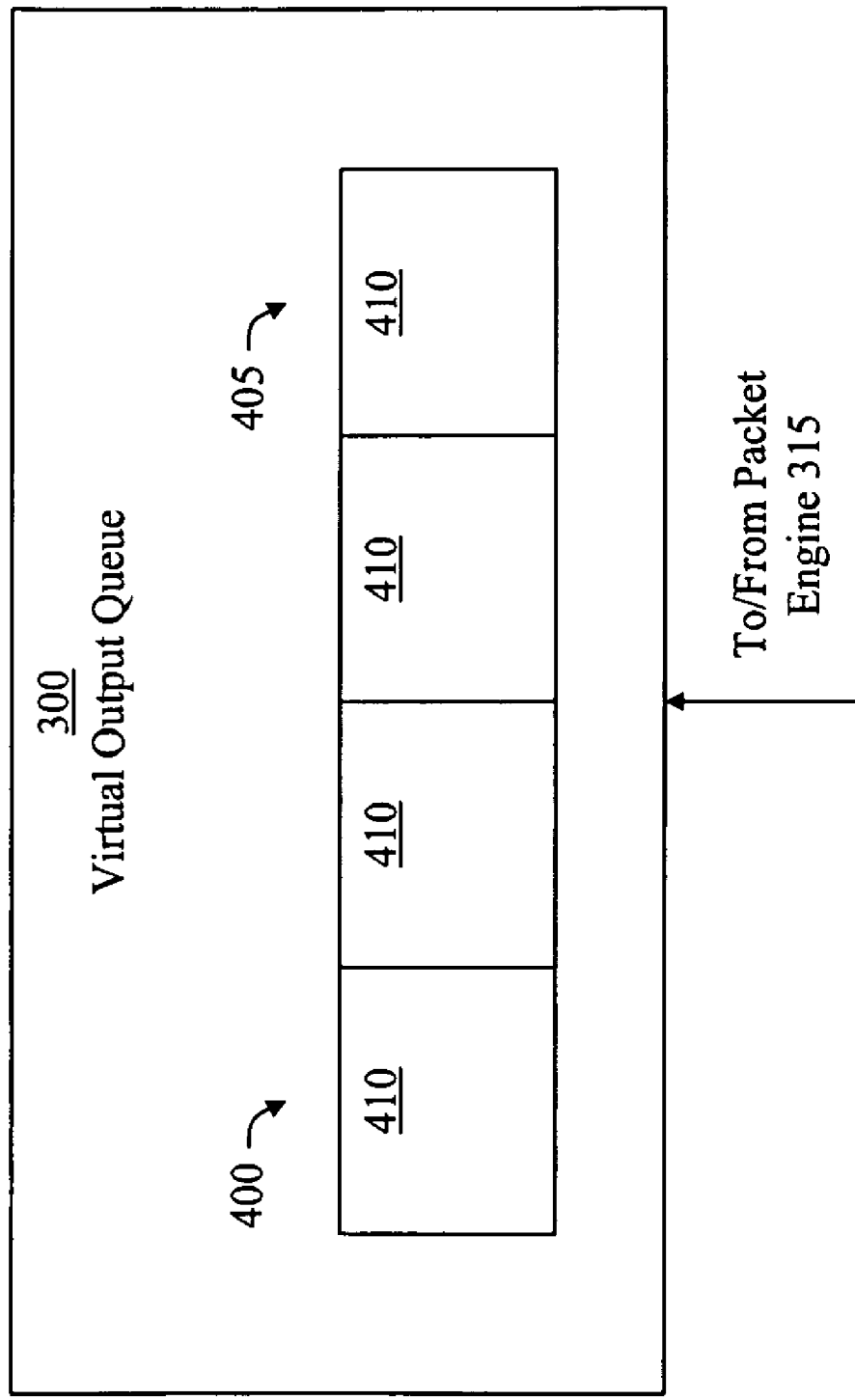
FIG. 4 is a block diagram of a virtual output queue, in accordance with an embodiment of the present invention.

FIG. 4 illustrates the virtual output queue 300, in accordance with an embodiment of the present invention. The virtual output queue 300 includes map units 410 for mapping data packets 200 stored in the input buffer 305 of the input port 125 including the virtual output queue 300 to the output port 140 corresponding to the virtual output queue 300. In various embodiments, the packet engine 315 of the input port 125 containing the virtual output queue 300 updates the virtual output queue 300 by modifying one or more of the map units 410 in the virtual output queue 300. For example, the packet engine 315 may modify one or more of the map units 410 to map a data packet 200 stored in the input buffer 305 of the input port 125 to the output port 140 corresponding to the virtual output queue 300. As another example, the packet engine 315 may modify one or more of the map units 410 to unmap a data packet 200 stored in the input buffer 305, for example when the last data unit 205 of the data packet 200 is provided to the switch fabric 135 and removed from the input buffer 305.

The virtual output queue 300 includes a tail pointer identifying a tail 400 of the virtual output queue 300 and a head pointer identifying a head 405 of the virtual output queue 300. The head 405 of the virtual output queue 300 maps the oldest data packet 200, if any, mapped by the virtual output queue 300. The tail 400 of the virtual output queue 300 maps the youngest data packet 200, if any, mapped by the virtual output queue 300. In some embodiments, the data packet 200 mapped at the tail 400 of the virtual output queue 300 may be the same data packet 200 mapped at the head 405 of the virtual output queue 300. For example, the virtual output queue 300 may be presently mapping only one data packet 200, which is both the youngest data packet 200 and oldest data packet 200 mapped by the virtual output queue 300.

In one embodiment, the map unit 410 includes a pointer, such as an address or an index, for identifying a data packet 200 stored in the input buffer 305. For example, the pointer of the map unit 410 may identify a storage location of the input buffer 305 containing the data packet 200. Because the pointer of the map unit 410 identifies the data packet 200 stored in the input buffer 305 and the virtual output queue 300 including the map unit 410 corresponds to an output port 140, the pointer of the map unit 410 in the virtual output queue 300 maps the data packet 200 to the output port 140 corresponding to the virtual output queue 300. In some embodiments, the pointer of the map unit 410 identifies the storage location of each data unit 205 of the data packet 200 stored in the input buffer 305. In this way, the pointer of the map unit 410 maps each data unit 205 of the data packet 200 to the output port 140 corresponding to the virtual output queue 300.

Figure 5:
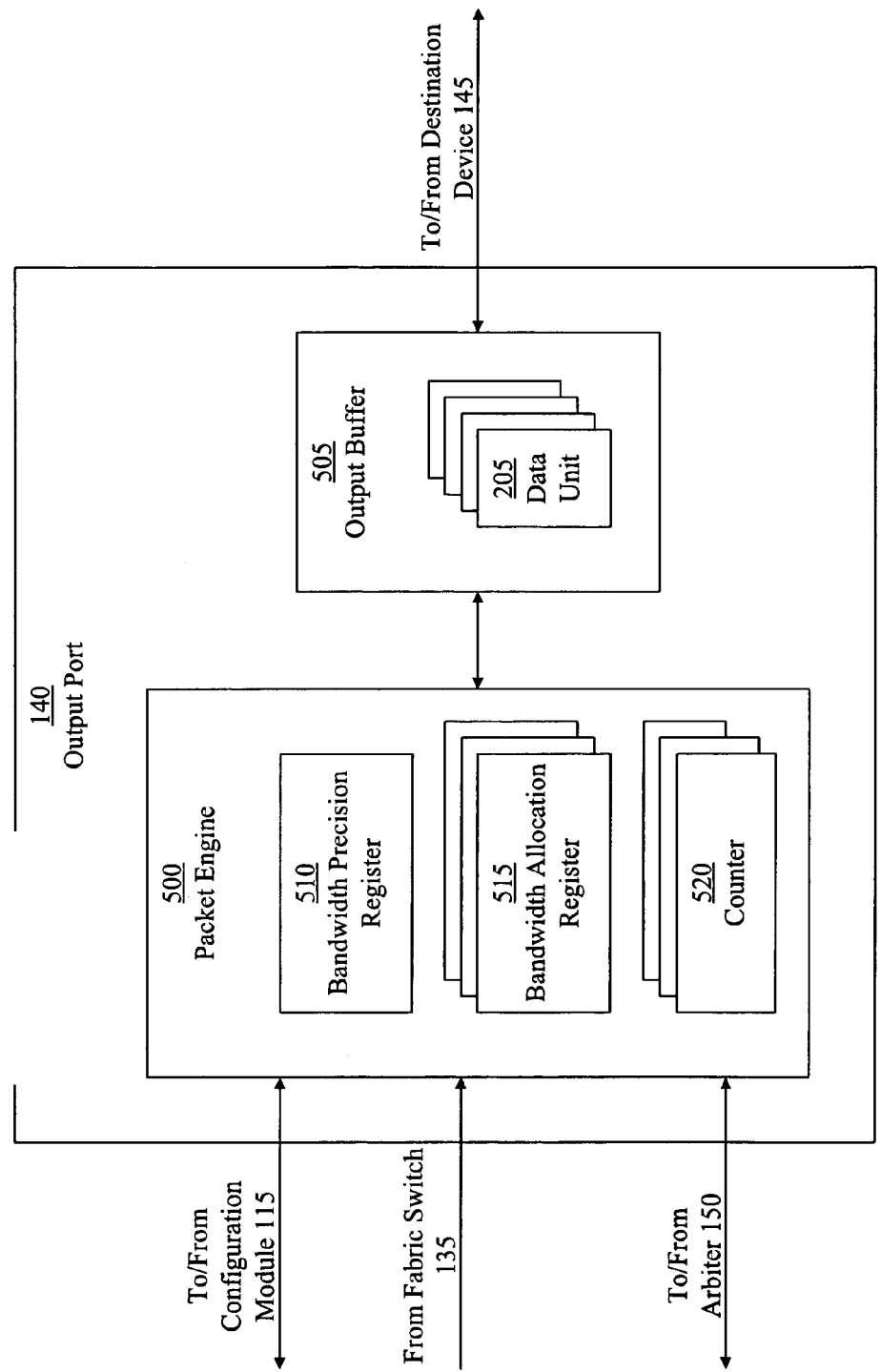
FIG. 5 is a block diagram of an output port of a packet switch, in accordance with an embodiment of the present invention.

FIG. 5 illustrates the output port 140, in accordance with an embodiment of the present invention. The output port 140 includes a packet engine 500 and an output buffer 505 coupled (e.g., connected) to the packet engine 500. The packet engine 500 includes a bandwidth precision register 510, bandwidth allocation registers 515, and counters 520. The bandwidth allocation registers 515 and the counters 520 correspond to virtual channels of the output port 140. Each bandwidth allocation register 515 stores a bandwidth allocation value indicating a portion of the output bandwidth of the output port 140 allocated to the virtual channel corresponding to the bandwidth allocation register 515. The bandwidth precision register 510 stores a bandwidth precision value indicating a precision for the bandwidth allocation values stored in the bandwidth allocation registers 515. Each counter 520 stores a credit value indicating a remaining bandwidth allocation of the output bandwidth of the output port 140 allocated to the virtual channel corresponding to the counter 520.

In various embodiments, the configuration module 115 writes a bandwidth precision value into the bandwidth precision register 510 of the output port 140 and writes a bandwidth allocation value into each bandwidth allocation register 515, for example based on user input received by the configuration module 115 through the communication channel 110. Additionally, the packet engine 500 of the output port 140 writes a credit value into each counter 520, for example upon power up, reset, or initialization of the packet switch 105. In some embodiments, the packet engine 500 of the output port 140 determines (e.g., computes) a credit value of a corresponding virtual channel of the output port 140 based on the bandwidth allocation value stored in the bandwidth allocation register 515 corresponding to the virtual channel and the bandwidth precision value stored in the bandwidth precision register 510 of the output port 140. Further, the packet engine 500 writes the credit value into the counter 520 corresponding to the virtual channel. In this way, the counter 520 corresponding to the virtual channel is initialized to its respective maximum credit value.

In various embodiments, the credit value of a virtual channel in an output port 140 is a positive value if the virtual channel has a remaining bandwidth allocation of the output bandwidth of the output port 140. Otherwise, the credit value of the virtual channel is a nonpositive value (e.g., a value equal to or less than zero). Moreover, the output port 140 selects a data packet 200 (e.g., a data unit 205 of a data packet 200) stored in the output buffer 505 of the output port 140 based on the credit value of the virtual channel identified by data packet 200 as well as the credit value of any virtual channel identified by any other data packet 200 stored in the output buffer 505. Further, the output port 140 outputs each data unit 205 of the selected data packet 200 from the packet switch 105 by outputting each data unit 205 of the selected data packet 200 from output port 140.

In one embodiment, the output port 140 selects a data packet 200 stored in the output buffer 505 identifying a virtual channel of the output port 140 having a highest credit value. In another embodiment, the output port 140 selects a data packet 200 stored in the output buffer 505 of the output port 140 by giving preference to any data packet 200 stored in the output buffer 505 identifying a virtual channel having a positive credit value over any data packet 200 stored in the output buffer 505 identifying a virtual channel having a nonpositive credit value.

In one embodiment, an output port 140 selects a data packet 200 stored in the output buffer 505 of the output port 140 based on a deficit round robin (DRR) algorithm. In this embodiment, the output port 140 identifies each virtual channel identified by a data packet 200 stored in the output buffer 505 of the output port 140. Further, the output port 140 selects one of the identified virtual channels having a positive credit value, if any, in a first phase of an arbitration cycle based on a round robin algorithm. If none of the identified virtual channels has a positive credit value, the output port 140 selects one of the identified virtual channels having a nonpositive credit value, if any, in a second phase of the arbitration cycle based on a round robin algorithm. The output port 140 then selects the oldest data packet 200 identifying the selected virtual channel stored in the output buffer 505 and outputs the selected data packet 200 from the packet switch 105.

The arbiter 150 selects input ports 125 of the packet switch 105 based on destination output ports 140 of the data packets 200 stored in the input ports 125. For example, the arbiter 150 may select input ports 125 based on a round robin algorithm such that the switch fabric 135 is capable of contemporaneously routing a data packet 200 from each selected input port 125 to each destination output port 140 of the data packet 200.

In some embodiments, the switch fabric 135 routes a data unit 205 from each selected input port 125 to the destination output port 140 of the data packet 200 containing the data unit 205 in an arbitration cycle. In this way, the switch fabric 135 contemporaneously routes a data packet 200 from each selected input port 125 to each destination output port 140 of the data packet 200. In some embodiments, the arbiter 150 continues to select an input port 125 in one or more subsequent arbitration cycles until each data unit 205 of the data packet 200 is routed from the selected input port 125 to the destination output port 140 of the data packet 200.

The packet engine 500 of the destination output port 140 receives each data unit 205 of the data packet 200 from the selected input port 125 through the switch fabric 135 and writes each data unit 205 of the data packet 200 into the output buffer 505 of the output port 140. In turn, the output buffer 505 stores the data unit 205. Further, the output port 140 outputs each data unit 205 of the data packet 200 stored in the output buffer 505 from the packet switch 105 to the destination device 145 corresponding to the output port 140. Moreover, the output port 140 may output a data unit 205 of a data packet 200 stored in the output buffer 505 before the output port 140 receives each data unit 205 of the data packet 200.

The output port 140 outputs data units 205 of a data packet 200 received by the output port 140 by outputting each data unit 205 of the data packet 200 to the destination device 145 corresponding to the output port 140 in sequence according to the order in which the output port 140 received the data units 205 of the data packet 200. Moreover, the output port 140 may output idle symbols between data units 205 of the sequence without outputting a data unit 205 of another data packet 200 between data units 205 of the sequence. In this way, the output port 140 outputs the data units 205 of the data packet 200 from the packet switch 105 as an atomic unit but the output port 140 need not store each data unit 205 of the data packet 200 before outputting the data packet 200 from the packet switch 105.

In various embodiments, the packet engine 500 of the output port 140 selects data packets 200 stored in the output buffer 505 of the output port 140 based on the virtual channels of the data packets 200. In these embodiments, the packet engine 500 of the output port 140 selects a data packet 200 stored in the output buffer 505 of the output port 140 based on the credit value of the virtual channel identified by the data packet 200 and decrements the credit value for each data unit 205 of the data packet 200 output from the output port 140. In this way, the packet engine 500 decrements the credit value stored in the counter 520 of the virtual channel by the number of data units 205 in the data packet 200.

In other embodiments, the packet engine 500 decrements the credit value stored in the counter 520 of a virtual channel of the output port 140 on a data packet boundary. For example, the packet engine 500 may decrement the credit value stored in the counter 520 of the virtual channel identified by a data packet 200 output by the output port 140 by the number of data units 205 in the data packet 200 when the output port 140 outputs the last data unit 205 of the data packet 200.

In some embodiments, the packet engines 315 of the input ports 125 or the packet engines 500 of the output ports 140, or both, may perform some or all of the functions of the arbiter 150 described herein. In some embodiments, arbiter 150 may perform some or all of the functions of the packet engines 315 of the input ports 125 described herein. In some embodiments, arbiter 150 may perform some or all of the functions of the packet engines 500 of the output ports 140 described herein. For example, the arbiter 150 may decrement the credit value stored in a counter 520 of an output port 140 corresponding to a virtual channel for each data unit 205 of a data packet 200 output by the output port 140 and identifying the virtual channel.

In some embodiments, one or more of the bandwidth precision registers 510, the bandwidth allocation registers 515, or the counters 520 of an output port 140 are external of the packet engine 500 of the output port 140. In some embodiments, one or more of the bandwidth precision registers 510, the bandwidth allocation registers 515, or the counters 520 of an output port 140 are external of output port 140. For example, the arbiter 150 may contain one or more of the bandwidth precision registers 510, the bandwidth allocation registers 515, or the counters 520 of an output port 140.

In some embodiments, the packet engine 500 of an output port 140 decrements the counters 520 of the output port 140 containing positive credit values by an attrition value so that the credit values stored in the counters 520 are eventually reduced to nonpositive credit values over time (e.g., credit values equal to or less than zero). In this way, the packet engine 500 promotes convergence of the bandwidth allocations of the virtual channels of the output port 140, which promotes fairness in routing data packets 200 through the output port 140. In some embodiments, the packet engine 500 of an output port 140 updates the counters 520 of the output port 140 on a data packet boundary by adding the bandwidth allocation values stored in the corresponding bandwidth allocation registers 515 of the output port 140 to the credit values stored in the counters 520 when each of the counters 520 reaches a threshold value and the output port 140 has completed outputting a data packet 200 from the packet switch 105. For example, the packet engine 500 may update the counters 520 when each of the counters 520 has reached a threshold value of zero and the output port 140 has completed outputting a data packet 200 from the packet switch 105. In various embodiments, the credit value stored in a counter 520 of an output port 140 may be a nonpositive value but may become a positive value when the packet engine 500 updates the counter 520 by adding the bandwidth allocation value stored in the corresponding bandwidth allocation register 515 to the credit value stored in the counter 520.

In various embodiments, the arbiter 150 is distributed among the input ports 125, the switch fabric 135, or the output ports 140, or some combination thereof. For example, the packet engines 315 of the input ports 125, the switch fabric 135, and the packet engines 500 of the output ports 140 may each include a portion of logic of the arbiter 150. In these embodiments, the input ports 125 communicate with the switch fabric 135 to perform arbitration for the input ports 125, and the switch fabric 135 communicates with the output ports 140 to perform arbitration for the output ports 140. In this way, the functionality of the arbiter 150 is distributed among the input ports 125, the switch fabric 135, and the output ports 140 of the packet switch 105.

In further embodiments, the switch fabric 135 includes a buffered crossbar. In these embodiments, the input ports 125 and the switch fabric 135 perform arbitration on the input ports 125 by selecting input ports 125 based on the capacity of the switch fabric 135 to accept data units 205 from the input ports 125. Additionally, the switch fabric 135 and the output ports 140 perform arbitration on the output ports 140 based on the capacity of the output ports 140 to accept data units 205 from the switch fabric 135. In various embodiments, the switch fabric 135 has capacity to accept a data unit 205 from an input port 125 when the switch fabric 135 has capacity to store the data unit 205, and an output port 140 has capacity to accept a data unit 205 when the output port 140 has capacity to store the data unit 205.

Exemplary bandwidth precision values and the number of bandwidth precision bits indicated by the bandwidth precision values are illustrated in Table 1 for an embodiment of the present invention. As illustrated in Table 1, the bandwidth precision values are not limited to one-hot encoded values and may indicate a number of bandwidth precision bits outside a bandwidth reservation precision range specified in the sRIO 2.0 standard. For example, a bandwidth precision value may indicate less than eight bandwidth precision bits or more than sixteen bandwidth precision bits.

TABLE 1

Bandwidth Precision Table

| Bandwidth Precision Value | Number of Bandwidth Precision Bits |
|---|---|
| 0x00 | 2 bits |
| 0x01 | 3 bits |
| 0x02 | 4 bits |
| 0x03 | 5 bits |
| 0x04 | 6 bits |
| 0x05 | 7 bits |
| 0x06 | 8 bits |
| 0x07 | 9 bits |
| 0x08 | 10 bits |
| 0x09 | 11 bits |
| 0x0A | 12 bits |
| 0x0B | 13 bits |
| 0x0C | 14 bits |
| 0x0D | 15 bits |
| 0x0E | 16 bits |
| 0x0F | 17 bits |
| 0x1F | 18 bits |

Figure 6:
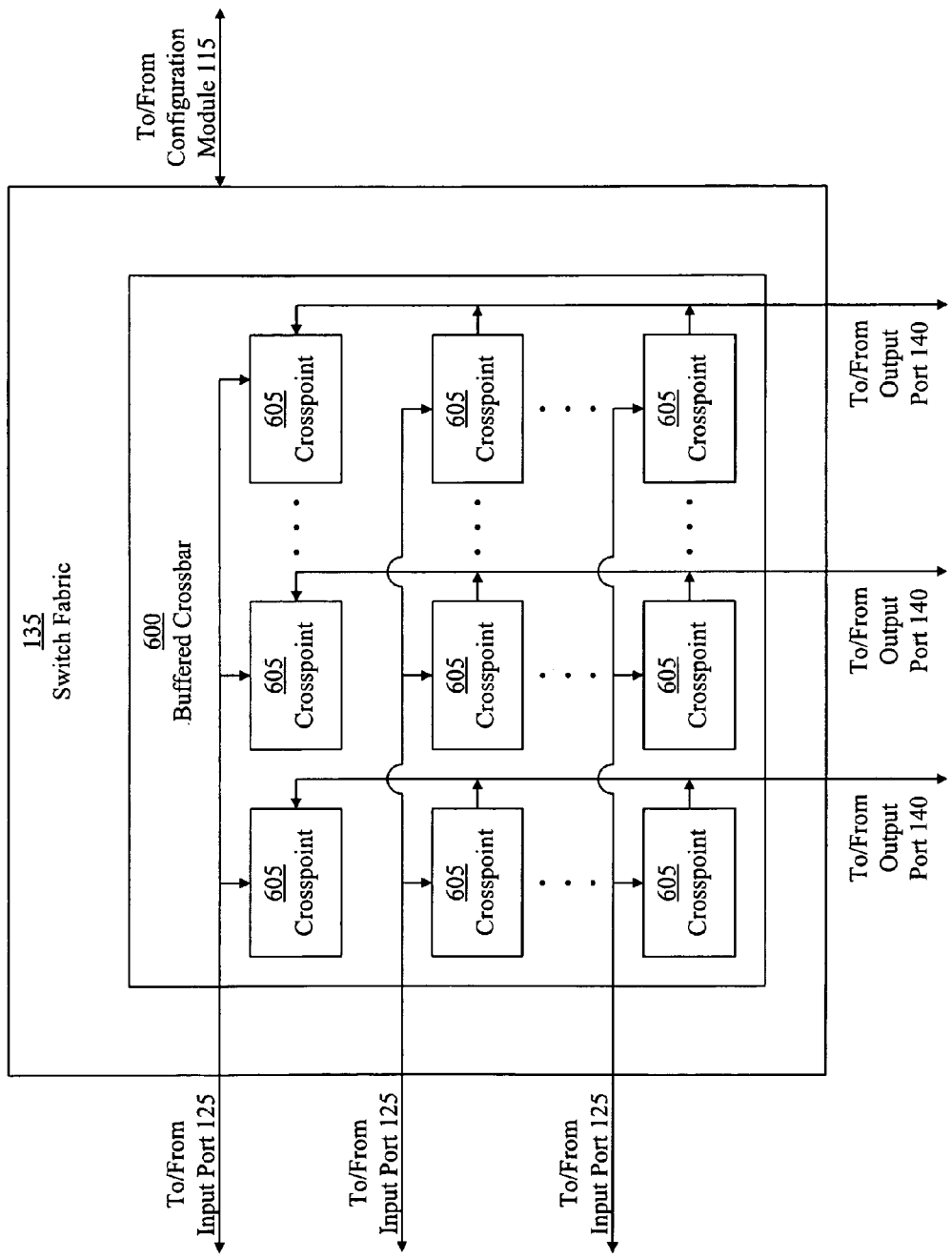
FIG. 6 is a block diagram of a switch fabric, in accordance with an embodiment of the present invention.

FIG. 6 is a block diagram of the switch fabric 135, in accordance with an embodiment of the present invention. In this embodiment, the switch fabric 135 includes a buffered crossbar 600. The buffered crossbar 600 includes crosspoints 605 interconnected with each other. Each of the crosspoints 605 is coupled (e.g., connected) to a corresponding input port 125 and a corresponding output port 140 of the packet switch 105. As may be envisioned from FIG. 6, the crosspoints 605 form a square matrix including rows of crosspoints 605 and columns of crosspoints 605. Each crosspoint 605 in a row of the matrix corresponds to an input port 125 of the packet switch 105 and is coupled (e.g., connected) to the input port 125. Moreover, each crosspoint 605 in a column of the matrix corresponds to an output port 140 of the packet switch 105 and is coupled (e.g., connected) to the output port 140. In this way, each of the input ports 125 is coupled to an output port 140 through a crosspoint 605 in the buffered crossbar 600.

Each crosspoint 605 receives data units 205 of a data packet 200 from the input port 125 corresponding to the crosspoint 605, stores the data units 205 of the data packet 200, and sends (e.g., routes) the data units 205 of the data packet 200 to the output port 140 corresponding to the crosspoint 605. In one embodiment, the crosspoint 605 has a storage capacity for storing one data unit 205 of a data packet 200. In this way, the crosspoint 605 is capable of storing a single data unit 205 of a data packet 200 at a given time. In other embodiments, the crosspoint 605 has a storage capacity for storing more than one data unit 205 of a data packet 200 and is capable of storing more than one data unit 205 of the data packet 200 at a given time. In some embodiments, the crosspoint 605 is capable of storing data units 205 of multiple data packets 200 at the same time.

In various embodiments, the arbiter 150 is distributed among the input ports 125, the crosspoints 605, and the output ports 140. In these embodiments, each input port 125 and the crosspoints 605 coupled to the input port 125 (e.g., crosspoints 605 in the row of the matrix corresponding to the input port 125) perform arbitration by selecting one of the crosspoints 605 coupled to the input port 125 based on the capacity of the crosspoint 605 to accept a data unit 205. For example, a crosspoint 605 may have capacity to accept a data unit 205 of a data packet 200 from an input port 125 when the crosspoint 605 has storage capacity to store the data unit 205. In some embodiments, each input port 125 and the crosspoints 605 coupled to the input port 125 perform arbitration on the crosspoints 605 coupled to the input port 125 by using a round robin algorithm.

Additionally, each output port 140 and the crosspoints 605 coupled to the output port 140 (e.g., crosspoints 605 in the column of the matrix corresponding to the output port 140) perform arbitration by selecting one of the crosspoints 605 coupled to the output port 140 and containing a data unit 205 of a data packet 200 to be routed to the output port 140. In various embodiments, each output port 140 and the crosspoints 605 coupled to the output port 140 perform arbitration on the crosspoints 605 coupled to the output port 140 by using a credit based arbitration algorithm, such as a deficit round robin algorithm.

Figure 7:
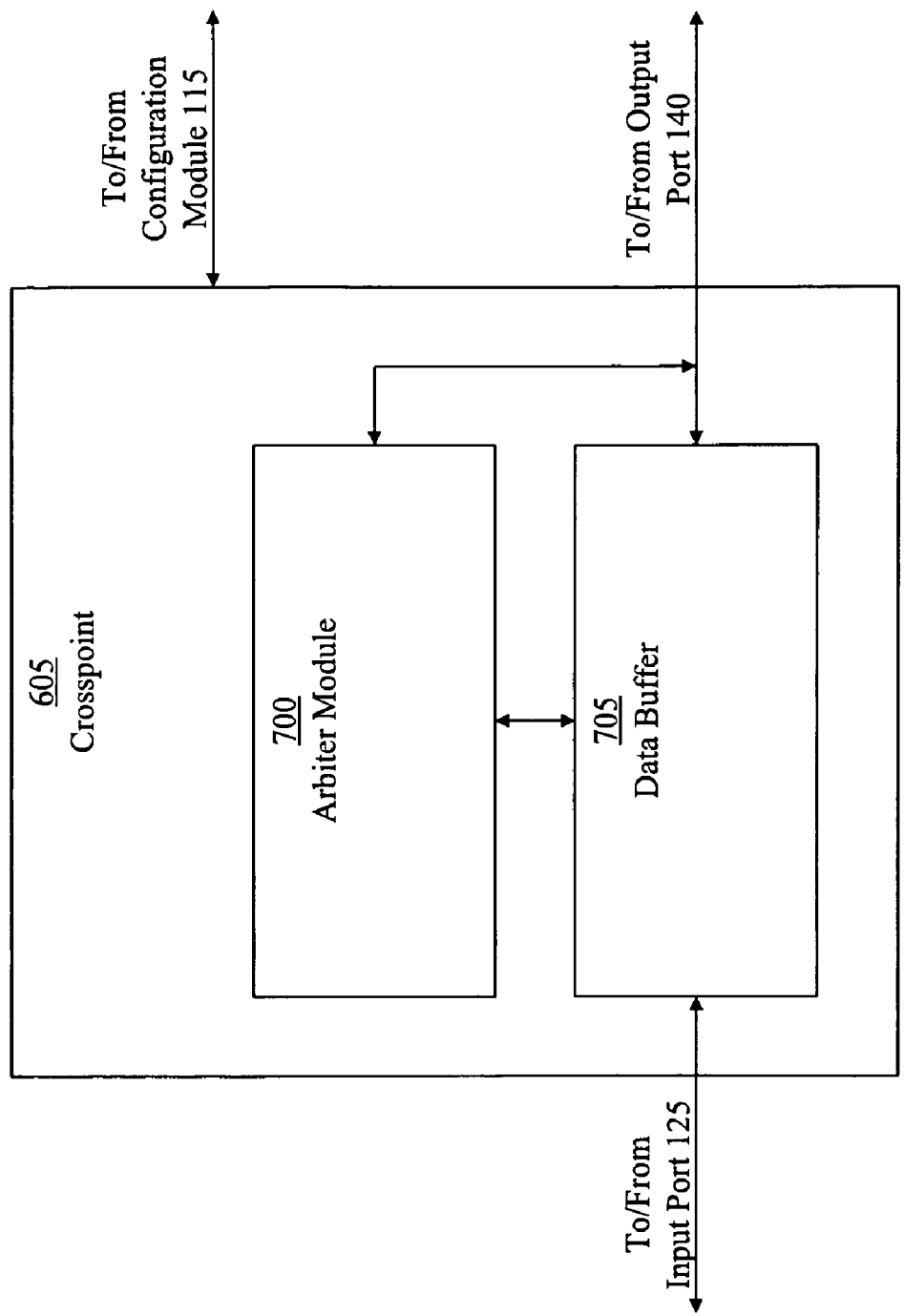
FIG. 7 is a block diagram of a crosspoint, in accordance with an embodiment of the present invention.

FIG. 7 is a block diagram of the crosspoint 605, in accordance with an embodiment of the present invention. The crosspoint 605 includes an arbiter module 700 and a data buffer 705 coupled (e.g., connected) to the arbiter module 700. The data buffer 705 receives data units 205 of data packets 200 from the input port 125 corresponding to the crosspoint 605 and stores the data units 205 of the data packets 200. In this way, the data buffer 705 is a storage location in the crosspoint 605. The arbiter modules 700 in the buffered crossbar 600 are part of the arbiter 150 and perform arbitration in the packet switch 105 in conjunction with the input ports 125 and the output ports 140 of the packet switch 105. In this way, the arbiter 150 is distributed in the packet switch 105.

In various embodiments, the arbiter modules 700 of the crosspoints 605 in the buffered crossbar 600 corresponding to an input port 125 (e.g., the crosspoints 605 in the row of the matrix corresponding to the input port 125) and the packet engine 315 of the input port 125 arbitrate for access to the crosspoints 605 corresponding to the input port 125. The arbiter module 700 of at least one crosspoint 605 corresponding to the input port 125 that is ready to receive a data unit 205 from the input port 125 grants access to the input port 125. The input port 125 selects a crosspoint 605 that granted access to the input port 125 and sends a data unit 205 to the crosspoint 605. In turn, the crosspoint 605 stores the data unit 205 in the data buffer 705 of the crosspoint 605. In this way, the data buffer 705 is a storage location for the data unit 205 in the crosspoint 605.

The packet engine 500 of an output port 140 arbitrates for access to the crosspoints 605 in the buffered crossbar 600 corresponding to the output port 140 (e.g., crosspoints 605 in the column of the matrix corresponding to the output port 140). The arbiter module 700 of at least one crosspoint 605 corresponding to the output port 140 and containing a data unit 205 ready to be sent to the output port 140 grants access to the output port 140. In turn, the packet engine 500 of the output port 140 selects a crosspoint 605 that granted access to the output port 140, reads one or more data units 205 from the crosspoint 605, and stores each data unit 205 of the data packet 200 in the output buffer 505 of the output port 140.

In some embodiments, the arbiter module 700 of a crosspoint 605 communicates with the output port 140 corresponding to the crosspoint 605 to send a data unit 205 to the output port 140. For example, the output port 140 may provide a signal to the arbiter module 700 indicating that the output port 140 is ready to receive a data unit 205. In turn, the arbiter module 700 may obtain access to the output port 140 and send a data unit 205 from the data buffer 705 to the output port 140. As another example, the arbiter module 700 may provide a signal to the output port 140 indicating that the data buffer 705 contains a data unit 205. In this example, the packet engine 500 of the output port 140 selects the crosspoint 605 containing the arbiter module 700 and reads the data unit 205 from the data buffer 705 of the crosspoint 605. In this way, the crosspoint 605 sends the data unit 205 to the output port 140.

Figure 8:
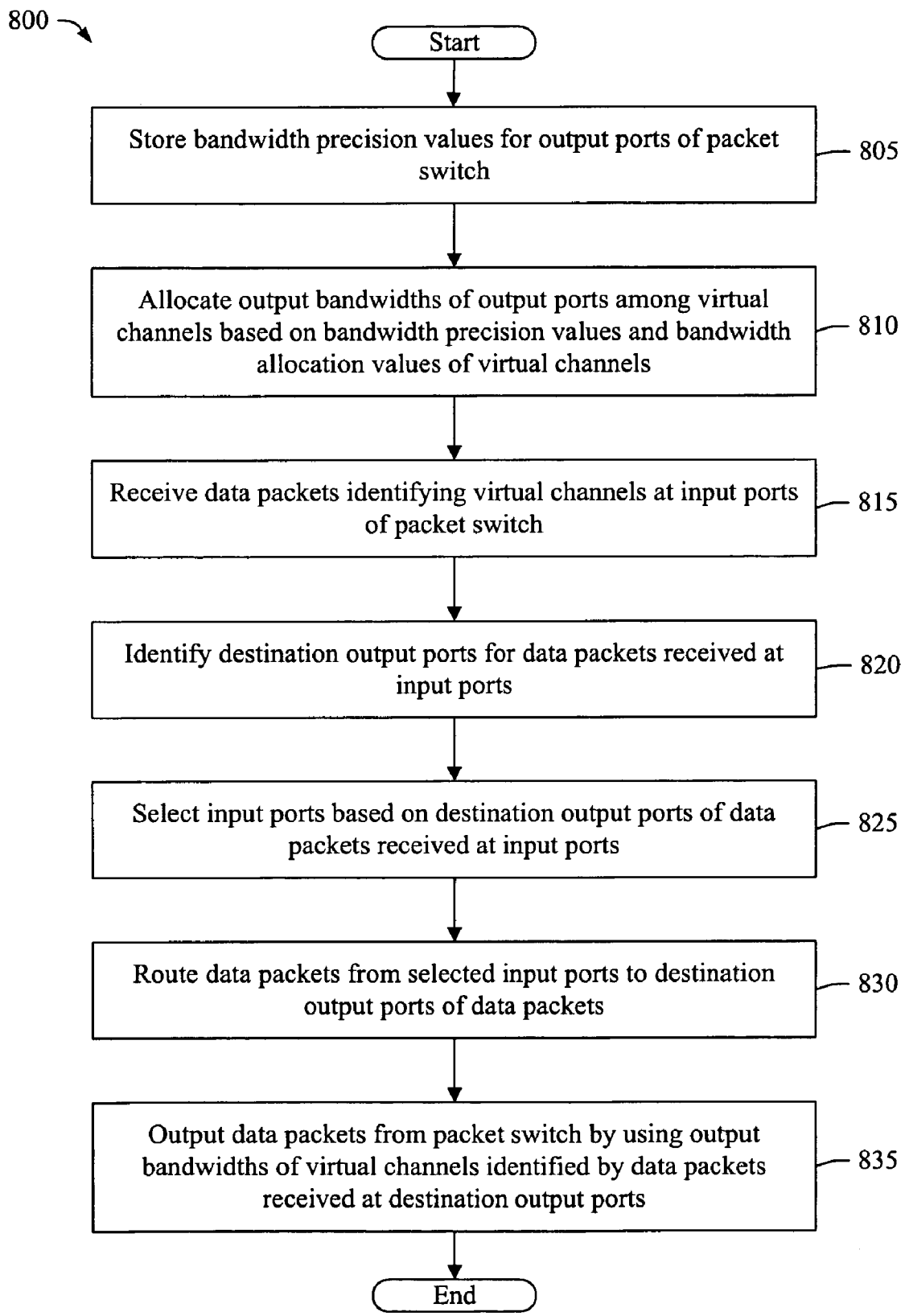
FIG. 8 is a flow chart of a method of routing data packets through a packet switch by using virtual channels, in accordance with an embodiment of the present invention.

FIG. 8 illustrates a method 800 of routing data packets through a packet switch by using virtual channels, in accordance with an embodiment of the present invention. In step 805, bandwidth precision values are stored for output ports of the packet switch. In various embodiments, each output port 140 of the packet switch 105 stores a bandwidth precision value in the bandwidth precision register 510 of the output port 140. In one embodiment, each output port 140 receives a bandwidth precision value from the configuration module 115 and the packet engine 500 of the output port 140 stores the bandwidth precision value in the bandwidth precision register 510 of the output port 140. In another embodiment, the configuration module 115 stores a bandwidth precision value into the bandwidth precision register 510 of each output port 140.

In various embodiments, the configuration module 115 determines the bandwidth precision values of the output ports 140 based on user input received through the communication channel 110. In this way, the packet switch 105 is programmable to select the bandwidth precision values stored in the bandwidth precision registers 510 of the output ports 140. In some embodiments, each of the output ports 140 has the same bandwidth precision value and the configuration module 115 determines the bandwidth precision value of the output ports 140 based on user input received through the configuration channel 110. In further embodiments, the bandwidth precision registers 510 of the output ports 140 are the same bandwidth precision register 510. In this way, the packet switch 105 need only have one bandwidth precision register 510 for the output ports 140 of the packet switch 105. The method 800 then proceeds to step 810.

In step 810, output bandwidths of the output ports of the packet switch are allocated among virtual channels of the output ports based on the bandwidth precision values and bandwidth allocation values of the virtual channels. In various embodiments, each output port 140 of the packet switch 105 receives a bandwidth allocation value for each virtual channel of the output port 140 from the configuration module 115 and stores the bandwidth allocation value into the bandwidth allocation register 515 of the output port 140 corresponding to the virtual channel. The bandwidth allocation value of each virtual channel of the output port 140 may have a positive value or a value of zero. Moreover, the bandwidth precision value of the output port 140 and the bandwidth allocation value of each virtual channel of the output port 140 determine the output bandwidth of the output port 140 allocated to the virtual channel. In this way, each of the output ports 140 allocates at least a portion of the output bandwidth of the output port 140 among virtual channels of the output port 140. If the bandwidth allocation value of a virtual channel of the output port 140 is zero, the portion of the output bandwidth of the output port 140 allocated to the virtual channel is zero.

Also in step 810, each output port 140 stores a credit value into each counter 520 of the output port 140 corresponding to a virtual channel of the output port 140. For example, each output port 140 may store the bandwidth allocation value of a virtual channel of the output port 140 into the counter 520 of the output port 140 corresponding to the virtual channel. In this way, the output ports 140 initialize the credit values stored in the counters 520 of the output ports 140 to indicate initial bandwidth allocations of the virtual channels. Moreover, the credit value of each virtual channel of the output port 140 indicates a remaining bandwidth allocation of the output bandwidth of the output port 140 allocated to the virtual channel.

In one embodiment, each output port 140 receives a bandwidth allocation value for each virtual channel of the output port 140 from the configuration module 115 and the packet engine 500 of the output port 140 stores the bandwidth allocation value of each virtual channel into the bandwidth allocation register 515 corresponding to the virtual channel. In another embodiment, the configuration module 115 stores a bandwidth allocation value for each virtual channel of each output port 140 into the bandwidth allocation register 515 of the output port 140 corresponding to virtual channel of the output port 140. In this way, the packet switch 105 is programmable to select the bandwidth allocation values stored in the bandwidth allocation registers 515 of the output ports 140. The method 800 then proceeds to step 815.

In step 815, data packets identifying virtual channels are received at input ports of the packet switch. In various embodiments, input ports 125 of the packet switch 105 each receive a data packet 200 identifying a virtual channel. For example, each data packet 200 may include a virtual channel identifier field for identifying a virtual channel. The method 800 then proceeds to step 820.

In step 820, a destination output port is identified for each data packet received by the input ports. In various embodiments, the packet engine 315 of each input port 125 receiving a data packet 200 identifies an output port 140 of the packet switch 105 as a destination output port 140 of the data packet 200. For example, the packet engine 315 of an input port 125 may identify a destination output port 140 for a data packet 200 received by the input port 125 based on a destination identifier (e.g., a destination address) in a data unit 205 of the data packet 200. Moreover, the virtual channel of the data packet 200 (e.g., the virtual channel identified by the data packet 200) in combination with the destination output port 140 of the data packet 200 (e.g., the output port 140 identified for the data packet 200) identifies a virtual channel in the destination output port 140 of the data packet 200. The method 800 then proceeds to step 825.

In step 825, input ports are selected based on the destination output ports of the data packets received at the input ports. In various embodiments, the arbiter 150 selects input ports 125 in an arbitration cycle based on the destination output ports 140 of the data packets 200 received by the input ports 125 so that the switch fabric 135 is capable of contemporaneously routing a data unit 205 from each selected input port 125 to the destination output port 140 of the data unit 205. For example, the arbiter 150 may select input ports 125 in an arbitration cycle based on a round robin algorithm so that the switch fabric 135 is capable of routing a data unit 205 from each selected input port 125 to the destination output port 140 of the data unit 205 in the arbitration cycle. As another example, the arbiter 150 may select input ports 125 in an arbitration cycle based on a round robin algorithm so that the switch fabric 135 is capable of routing a data unit 205 from each selected input port 125 to the destination output port 140 of the data unit 205 in the next arbitration cycle. The method 800 then proceeds to step 830.

In step 830, data packets are routed from the selected input ports to the destination output ports of the data packets. In various embodiments, the switch fabric 135 routes a data packet 200 from each selected input port 125 to the destination output port 140 of the data packet 200. In one embodiment, the switch fabric 135 routes a data unit 205 of a data packet 200 from each selected input port 125 to the destination output port 140 of the data packet 200 in an arbitration cycle. In this way, the switch fabric 135 routes data units 205 to corresponding output ports 140 by contemporaneously routing a data unit 205 from each selected input port 125 to the destination output port 140 of the data unit 205. Moreover, each of the selected input ports 125 remains selected by the arbiter 150 in one or more subsequent arbitration cycles until all data units 205 of the data packet 200 are routed from the selected input port 125 to the destination output port 140 of the data packet 200. The method 800 then proceeds to step 835.

In step 835, data packets are output from the packet switch by using the bandwidth allocations of the virtual channels identified by the data packets received at the destination output ports. In various embodiments, each destination output port 140 receiving a data unit 205 of a data packet 200 outputs the data unit 205 from the packet switch 105 by using the output bandwidth of the output port 140 allocated to the virtual channel identified by the data packet 200. Additionally, the output port 140 decrements the credit value of the virtual channel identified by the data packet 200, for example by decrementing the credit value by the number of data units 205 in the data packet 200 based on a data packet boundary of the data packet 200. In this way, the output port 140 updates the credit value of the virtual channel identified by the data packet 200 to indicate the remaining bandwidth allocation of the virtual channel. The method 800 then ends. Alternatively, the method 800 may return to one of steps 805-825 after step 835. In this way, the method 800 may route additional data packets 200 through the packet switch 105.

In various embodiments, the method 800 may include more or fewer steps than the steps 805-835 described above and illustrated in FIG. 8. In some embodiments, one or more of the steps 805-835 of the method 800 may be performed in parallel or substantially simultaneously. For example step 805 and the step 810 may be performed in parallel. In various embodiments, steps 805-835 of the method 800 may be performed in a different order than the order described above and illustrated in FIG. 8. For example, step 815 and may be performed before step 810.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A packet switch, comprising:
   a plurality of output ports each having an output bandwidth and configured to store a bandwidth precision value for the output port indicating a number of bandwidth precision bits in a range including a number of bandwidth precision bits outside a bandwidth reservation precision

17 range specified in a serial RapidIO 2.0 standard and to allocate at least a portion of the output bandwidth of the output port among a plurality of virtual channels based on a plurality of bandwidth allocations values of the output port corresponding to the plurality of virtual channels and the bandwidth precision value of the output port;

a plurality of input ports each configured to receive a data packet identifying a virtual channel for the data packet and compliant with the serial RapidIO 2.0 standard and to identify at least one destination output port of the plurality of output ports for the data packet;

an arbiter coupled to the plurality of input ports and the plurality of output ports, the arbiter configured to select at least one input port of the plurality of input ports based on the destination output ports of the data packets received by the plurality of input ports; and a switch fabric coupled to the plurality of input ports and the plurality of output ports and configured to route each data packet received by the at least one selected input port to at least one destination output port of the data packet, each output port of the plurality of output ports further configured to output each data packet received from the switch fabric by using the output bandwidth of the output port allocated to the virtual channel identified by the data packet.

2. The packet switch of claim 1, wherein each input port of the plurality of input ports comprises a plurality of virtual output queues corresponding to the plurality of output ports for mapping the data packet received by the input port to the destination output port of the data packet.

3. The packet switch of claim 1, wherein each output port of the plurality of output ports further comprises:

a plurality of counters configured to store a plurality of credit values corresponding to the plurality virtual channels and each indicating a remaining bandwidth allocation of the output bandwidth of the output port allocated to the corresponding virtual channel; and an output buffer configured to store each data packet received by the output port from the switch fabric, wherein the output port is further configured to output each data packet received from the switch fabric by selecting the data packet based on the credit value of the virtual channel identified by the data packet.

4. The packet switch of claim 3, wherein each output port of the plurality of output ports is further configured to decrement the credit value of the virtual channel identified by each data packet output by the output port.

5. The packet switch of claim 1, wherein each output port of the plurality of output ports comprises a bandwidth precision register configured to store the bandwidth precision value of the output port.

6. The packet switch of claim 5, wherein the bandwidth precision register of an output port of the plurality of output ports is a writable register and the packet switch further comprises a configuration module coupled to the output port and configured to write a bandwidth precision value into the bandwidth precision register of the output port.

7. The packet switch of claim 5, wherein the bandwidth precision register of an output port of the plurality of output ports is configured to store a bandwidth precision value indicating a number of bandwidth precision bits less than eight.

8. The packet switch of claim 5, wherein the bandwidth precision register of an output port of the plurality of output ports is configured to store a bandwidth precision value indicating a number of bandwidth precision bits greater than sixteen.

18

9. The packet switch of claim 1, wherein each output port of the plurality of output ports comprises a plurality of bandwidth allocation registers corresponding to the plurality of virtual channels and configured to store the plurality of bandwidth allocation values corresponding to the plurality of virtual channels, each bandwidth allocation value of the plurality of bandwidth allocation values indicating a portion of the output bandwidth of the output port allocated to the corresponding virtual channel.

10. The packet switch of claim 1, wherein the switch fabric comprises a buffered crossbar.

11. A packet switch, comprising:

a plurality of output ports each having an output bandwidth and comprising:

a bandwidth precision register configured to store a bandwidth precision value for the output port indicating a number of bandwidth precision bits in a range including a number of bandwidth precision bits outside a bandwidth reservation precision range specified in a serial RapidIO 2.0 standard;

a plurality of bandwidth allocation registers corresponding to a plurality of virtual channels and configured to store a plurality of bandwidth allocation values of the output port corresponding to the plurality of virtual channels; and a packet engine configured to allocate at least a portion of the output bandwidth of the output port among the plurality of virtual channels based on the plurality of bandwidth allocation values of the output port and the bandwidth precision value of the output port;

a plurality of input ports each configured to receive a data packet identifying a virtual channel for the data packet and compliant with the serial RapidIO 2.0 standard, each input port of the plurality of input ports further configured to identify at least one destination output port of the plurality of output ports for the data packet received by the input port;

an arbiter coupled to the plurality of input ports and the plurality of output ports, the arbiter configured to select at least one input port of the plurality of input ports based on the destination output ports of the data packets received by the plurality of input ports; and a switch fabric coupled to the plurality of input ports and the plurality of output ports and configured to route each data packet received by the at least one selected input port to at least one destination output port of the data packet, each output port of the plurality of output ports further configured to output each data packet received from the switch fabric by using the output bandwidth of the output port allocated to the virtual channel identified by the data packet.

12. The packet switch of claim 11, wherein each input port of the plurality of input ports comprises a plurality of virtual output queues corresponding to the plurality of output ports for mapping the data packet received by the input port to the destination output port of the data packet.

13. The packet switch of claim 11, wherein each output port of the plurality of output ports further comprises:

a plurality of counters configured to store a plurality of credit values corresponding to the plurality of virtual channels each indicating a remaining bandwidth allocation of the output bandwidth of the output port allocated to the corresponding virtual channel; and an output buffer configured to store each data packet received by the output port from the switch fabric, wherein the output port is further configured to output each data packet received from the switch fabric by selecting the data packet based on the credit value of the virtual channel identified by the data packet.

14. The packet switch of claim 13, wherein each output port of the plurality of output ports is further configured to decrement the credit value of the virtual channel identified by each data packet output by the output port.

15. The packet switch of claim 11, wherein the bandwidth precision register of an output port of the plurality of output ports is a writable register and the packet switch further comprises a configuration module coupled to the output port and configured to write a bandwidth precision value into the bandwidth precision register of the output port.

16. The packet switch of claim 11, wherein the bandwidth precision register of an output port of the plurality of output ports is configured to store a bandwidth precision value indicating a number of bandwidth precision bits less than eight.

17. The packet switch of claim 11, wherein the bandwidth precision register of an output port of the plurality of output ports is configured to store a bandwidth precision value indicating a number of bandwidth precision bits greater than sixteen and each bandwidth allocation register of the plurality of bandwidth allocation registers of the output port is configured to store a bandwidth allocation value having a precision greater than sixteen bits.

18. The packet switch of claim 11, wherein the switch fabric comprises a buffered crossbar.

19. A method of routing data packets through a packet switch, the method comprising:
receiving data packets at a plurality of input ports of a packet switch, each of the data packets identifying a virtual channel for the data packet and compliant with a serial RapidIO 2.0 standard;
identifying at least one destination output port of a plurality of output ports of the packet switch for each data packet received by an input port of the plurality of input ports, each output port of the plurality of output ports having an output bandwidth;
storing a bandwidth precision value for each output port of the plurality of output ports indicating a number of bandwidth precision bits in a range including a number of bandwidth precision bits outside a bandwidth reservation precision range specified in the serial RapidIO 2.0 standard;
allocating at least a portion of the output bandwidth of each output port of the plurality of output ports among a plurality of virtual channels based on a plurality of bandwidth allocations values of the output port corresponding to the plurality of virtual channels and the bandwidth precision value of the output port;
selecting at least one input port of the plurality of input ports based on the destination output ports of the data packets received by the plurality of input ports;
routing each data packet received by the at least one selected input port to at least one destination output port of the data packet; and
outputting each data packet received by an output port of the plurality of output ports from the packet switch by using the output bandwidth of the output port allocated to the virtual channel identified by the data packet.

20. The method of claim 19, further comprising:
storing a plurality of credit values corresponding to the plurality of virtual channels for each output port of the plurality of output ports each indicating a remaining bandwidth allocation of the output bandwidth of the output port allocated to the corresponding virtual channel; and
storing each data packet received by each output port in the output port, wherein outputting each data packet received by an output port of the plurality of output ports from the packet switch comprises selecting the data packet based on the credit value of the virtual channel identified by the data packet.

21. The method of claim 20, wherein outputting each data packet received by an output port of the plurality of output ports from the packet switch comprises decrementing the credit value of the virtual channel identified by the data packet.

22. The method of claim 19, wherein the bandwidth precision value of an output port of the plurality of output ports indicates a number of bandwidth precision bits greater than sixteen.

23. The method of claim 19, wherein the bandwidth precision value of an output port of the plurality of output ports indicates a number of bandwidth precision bits less than eight.

24. The method of claim 19, wherein the switch fabric comprises a buffered crossbar.

* * * * *